(12) United States Patent
Yang et al.

(10) Patent No.: US 11,913,453 B2
(45) Date of Patent: Feb. 27, 2024

(54) SLIDE VALVE FOR A TWIN-SCREW COMPRESSOR

(71) Applicants: Johnson Controls Technology Company, Auburn Hills, MI (US); JOHNSON CONTROLS AIR CONDITIONING AND REFRIGERATION (WUXI) CO., LTD., Wuxi (CN)

(72) Inventors: Shengmei Yang, Wuxi (CN); Shahebaz Malik, Mechanicsburg, PA (US)

(73) Assignees: Johnson Controls Tyco IP Holdings LLP, Milwaukee, WI (US); Johnson Controls Air Conditioning and Refrigeration (Wuxi) Co., Ltd., Jiangsu (CN)

( * ) Notice: Subject to any disclaimer, the term of this patent is extended or adjusted under 35 U.S.C. 154(b) by 348 days.

(21) Appl. No.: 16/652,378

(22) PCT Filed: Sep. 26, 2018

(86) PCT No.: PCT/IB2018/057427
§ 371 (c)(1),
(2) Date: Mar. 30, 2020

(87) PCT Pub. No.: WO2019/064187
PCT Pub. Date: Apr. 4, 2019

(65) Prior Publication Data
US 2020/0291942 A1    Sep. 17, 2020

(30) Foreign Application Priority Data

Sep. 30, 2017   (CN) .......................... 201721291991.9

(51) Int. Cl.
*F03C 2/00*    (2006.01)
*F03C 4/00*    (2006.01)
(Continued)

(52) U.S. Cl.
CPC ............ *F04C 28/12* (2013.01); *F04C 18/088* (2013.01); *F04C 18/16* (2013.01);
(Continued)

(58) Field of Classification Search
CPC .... F04C 18/0238; F04C 18/088; F04C 18/16; F04C 28/12; F04C 29/0035; F04C 29/06;
(Continued)

(56) References Cited

U.S. PATENT DOCUMENTS 3,151,806 A  *  10/1964  Whitfield ................ F04C 28/12
                                                    418/201.2
4,025,244 A  *  5/1977   Sato ........................ F04C 28/12
                                                    418/87
(Continued)

FOREIGN PATENT DOCUMENTS

CN      202752879 U  *  2/2013  ............... B23Q 3/02
CN      109058115 A  *  12/2018 .............. F04C 18/16
(Continued)

OTHER PUBLICATIONS

CN-202752879-U—Sun Yuan—Sliding Valve Tool of Double Screw Rod Compressor—Feb. 27, 2013—the English Machine Translation. (Year: 2013).*
(Continued)

*Primary Examiner* — Theresa Trieu
(74) *Attorney, Agent, or Firm* — Fletcher Yoder, PC

(57) ABSTRACT

The present application provides a slide valve, wherein the slide valve is configured to regulate a load of a twin-screw compressor. The slide valve comprises a slide valve body, wherein the slide valve body has a connecting end and a free end, the connecting end is configured to connect to a slide valve connecting rod of the twin-screw compressor, and the slide valve is driven to slide by the slide valve connecting rod. A cavity is formed in the free end of the slide valve (Continued)

body, and the slide valve has a passage configured to fluidly couple the cavity with an external fluid to reduce air flow pulsations on a suction side of the twin-screw compressor and thereby reduce overall air flow pulsations in the twin-screw compressor.

16 Claims, 6 Drawing Sheets

(51) Int. Cl.
*F04C 2/00* (2006.01)
*F04C 18/00* (2006.01)
*F04C 28/12* (2006.01)
*F04C 18/08* (2006.01)
*F16K 3/26* (2006.01)
*F04C 29/00* (2006.01)
*F04C 18/16* (2006.01)

(52) U.S. Cl.
CPC ............ *F04C 29/0035* (2013.01); *F16K 3/26* (2013.01); *F04C 2270/14* (2013.01)

(58) Field of Classification Search
CPC .. F04C 2270/13; F04C 2270/14; F01C 20/12; F16K 3/26
See application file for complete search history.

(56) References Cited

U.S. PATENT DOCUMENTS

| | | | | | |
|---|---|---|---|---|---|
| 4,575,323 | A | * | 3/1986 | Yoshimura | ............ F04C 28/125 |
| | | | | | 418/201.2 |
| 8,459,963 | B2 | * | 6/2013 | Pileski | ............ F04C 28/12 |
| | | | | | 418/201.2 |
| 2004/0040332 | A1 | * | 3/2004 | Roelke | ............ F04C 28/12 |
| | | | | | 418/201.2 |
| 2005/0226758 | A1 | * | 10/2005 | Hossner | ............ F04C 28/12 |
| | | | | | 418/201.2 |
| 2006/0165543 | A1 | * | 7/2006 | Fox | ............ F04C 18/16 |
| | | | | | 418/201.1 |
| 2008/0038121 | A1 | * | 2/2008 | Shoulders | ............ F04C 18/16 |
| | | | | | 418/201.1 |

FOREIGN PATENT DOCUMENTS

| | | | |
|---|---|---|---|
| EP | 2209968 A1 | 7/2010 | |
| JP | S56143388 A | 11/1981 | |
| JP | H02169891 A | 6/1990 | |
| JP | H07217563 A | 8/1995 | |
| JP | H1082385 A | 3/1998 | |
| JP | H11148479 A | 6/1999 | |
| JP | 2005030362 A | 2/2005 | |
| WO | WO-2020056982 A1 * | 3/2020 | ............ F04C 18/16 |

OTHER PUBLICATIONS

JP07217563A—Yanagisawa et al.—Hollow Rotor for a Screw Fluid Machine—Aug. 15, 1995—the English Translation. (Year: 1995).*
International Search Report and Written Opinion for PCT Application No. PCT/IB2018/057427, dated Dec. 3, 2018, 3 pgs.
Japanese Office Action for JP Application No. 2020-517832, dated Jun. 28, 2022, 8 pgs.
Korean Office Action for KR Application No. 10-2020-7011320, dated Jul. 21, 2022, 5 pgs.

* cited by examiner

SLIDE VALVE FOR A TWIN-SCREW COMPRESSOR

CROSS-REFERENCE TO RELATED APPLICATIONS

This application is a National Stage Application of PCT International Application No. PCT/IB2018/057427, entitled "A SLIDE VALVE FOR A TWIN-SCREW COMPRESSOR," filed Sep. 26, 2018, which is herein incorporated by reference in its entirety, and which claims priority to Chinese Patent Application No. 201721291991.9, entitled "A SLIDE VALVE FOR A TWIN-SCREW COMPRESSOR," filed Sep. 30, 2017, which is herein incorporated by reference in its entirely.

TECHNICAL FIELD

The present application relates to the field of compressors and, in particular, relates to a slide valve for a twin-screw compressor.

BACKGROUND ART

The slide valve is an important component which enables load regulation of the twin-screw compressor. By moving the position of the slide valve in an axial direction of a screw rotor of the twin-screw compressor, the effective working length of the screw rotor can be changed to regulate the amount of air delivered by the twin-screw compressor.

Discontinuous inter-tooth volumes may be formed via the engagement of the screw rotor of the twin-screw compressor, which may cause the suction cavity and the exhaust cavity of the twin-screw compressor to be periodically connected to the working cavity of the twin-screw compressor. As a result, the cooling medium fluid may flow unsteadily through the twin-screw compressor, which may cause air flow pulsations during suction and exhaust. The air flow pulsations on the suction side and exhaust side of the twin-screw compressor may cause vibrations and noise during operation of the twin-screw compressor. Therefore, it is desirable to reduce air flow pulsations of the twin-screw compressor.

Because of the characteristics of the twin-screw compressor, fluid pressure pulsations may exist on both the suction side and the exhaust side of the twin-screw compressor, and the energy of the pulsations may correlate to an acoustic load of the fluid in the compressor. Currently, many technologies for governing exhaust pulsations are reflected in the construction of the structure of slide valves, but the structure of slide valves has not been effectively utilized to construct a pulsation attenuation design on the suction side of compressors to attenuate the energy of air flow pulsations, lower the overall pressure pulsation level in compressors, or alleviate vibrations and noise of compressors.

SUMMARY OF THE DISCLOSURE

To solve the above-mentioned problem, the objective of the present disclosure is to provide a slide valve for a twin-screw compressor. By attenuating the energy of air flow on a suction side of the twin-screw compressor to reduce the air flow pulsations on the suction side, the overall air flow pulsation level is lowered, and vibrations and noise of the twin-screw compressor are alleviated.

To achieve the above-mentioned objective, in a first aspect, the present disclosure provides a slide valve configured to regulate a load of a twin-screw compressor.

The slide valve comprises a slide valve body, the slide valve body has a connecting end and a free end, the connecting end is configured to connect to a slide valve connecting rod, and the slide valve is driven to slide within the twin-screw compressor by the slide valve connecting rod. A cavity is formed inside the free end of the slide valve body, and the slide valve has at least one passage configured to fluidly connect the cavity with an external fluid to reduce air flow pulsations on the suction side of the twin-screw compressor.

According to present embodiments, one cavity is formed in the free end, the slide valve has a cover on an end face of the free end, the cover has a plurality of holes, and the plurality of holes is connected to the cavity to form a plurality of passages.

According to present embodiments, each hole of the plurality of holes is circular, and each hole has the same size.

According to present embodiments, a plurality of cavities is formed in the free end, and each cavity of the plurality of cavities has its own passage.

According to present embodiments, a plurality of cavities is formed in the free end, a first set of the plurality of cavities has one respective passage each, and at least one cavity of the plurality of cavities has a plurality of passages.

In a second aspect, the present disclosure provides a slide valve configured to regulate a load of a twin-screw compressor. The slide valve comprises a slide valve body, the slide valve body has a connecting end and a free end, the connecting end is configured to connect to a slide valve connecting rod to drive the slide valve to slide within the twin-screw compressor, and the free end of the slide valve body has a free end extension portion extending away from the free end. The free end extension portion has a cavity formed therein, and the slide valve has a passage configured to fluidly connect the cavity with an external fluid to reduce air flow pulsations on a suction side of the twin-screw compressor.

According to present embodiments, the free end extension portion is configured to provide an additional support at partial load of the twin-screw compressor.

According to present embodiments, the free end extension portion has holes on a surface of the free end extension portion, and the holes are connected to the cavity to form passages.

According to present embodiments, the holes are provided on an outside surface of the free end extension portion.

According to present embodiments, a top end of the free end extension portion is offset from a top end of the free end so that a stepped surface is formed, and the holes are formed in the stepped surface.

In a third aspect, the present disclosure provides a twin-screw compressor, and the twin-screw compressor is configured to use a slide valve described in any of the above aspects.

On the basis of the structure of a prior slide valve, the slide valve's function of regulating a load of a twin-screw compressor is reserved for the slide valve of the present disclosure. In addition, a fluid pulsation attenuating structure is formed by providing cavities in the slide valve body that are configured to connect to an external fluid so that energy of air flow pulsations on the suction side of the twin-screw compressor is reduced, the overall air flow pulsations in the twin-screw compressor are reduced, vibrations and noise of the twin-screw compressor are alleviated, and the running reliability of the twin-screw compressor at various loads is improved. Moreover, the structure of the present disclosure is simple, no additional attenuation device is used, and no extra pressure loss is caused.

DESCRIPTION OF DRAWINGS

These and other characteristics and advantages of the present disclosure can be better understood by reading the following description with reference to the drawings. In all the drawings, the same reference number represents the same component, wherein.

DETAILED DESCRIPTION

Figure 1A:
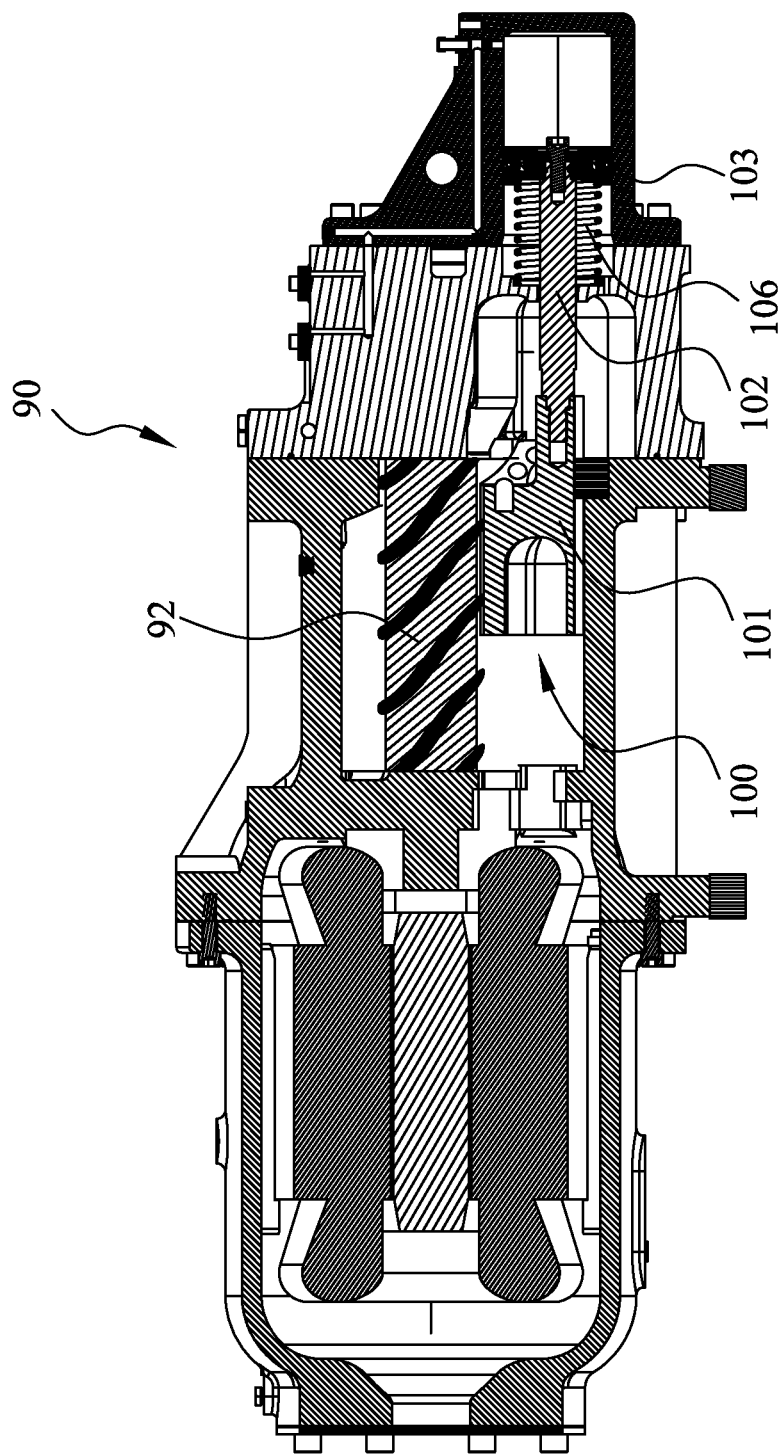
FIG. 1A is a cutaway view of a twin-screw compressor in the longitudinal direction of a screw rotor, where the slide valve is provided below the screw rotor.

The following will describe various specific implementation modes of the present disclosure by reference to the drawings which constitute a part of the present description. It should be understood that although the terms indicating directions, such as "before", "behind", "above", "below", "left", and "right" are used in the present disclosure to describe various exemplified structural parts and components of the present disclosure, these terms are just used for the convenience of illustrations and are determined based on the exemplified directions in the drawings. Since the embodiments disclosed in the present disclosure can be set in different directions, these terms indicating directions are only used for illustrations, instead of restrictions. In the following drawings, the same components use the same reference numbers, and similar components use similar reference numbers so as to avoid repeated descriptions.

FIG. 1A is a cutaway view of a twin-screw compressor (90) in the longitudinal direction of a screw rotor (92), where a slide valve (100) is provided below the screw rotor (92).

Figure 1B:
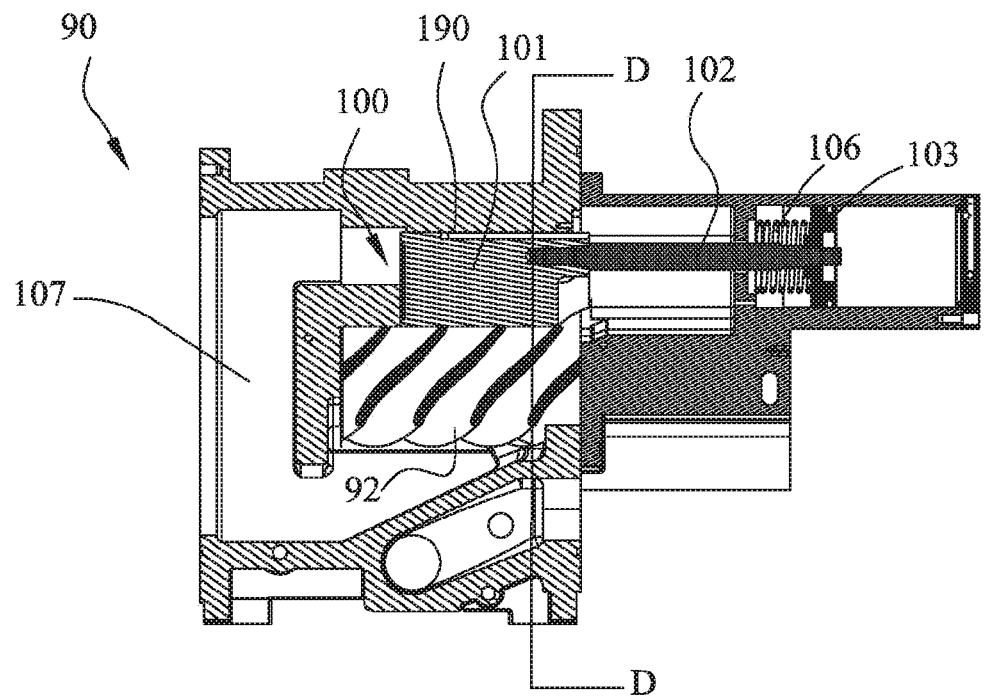
FIG. 1B is a partial cutaway view of a twin-screw compressor in the longitudinal direction of a screw rotor and shows a position (above the screw rotor) of the slide valve at full load.
Figure 1C:
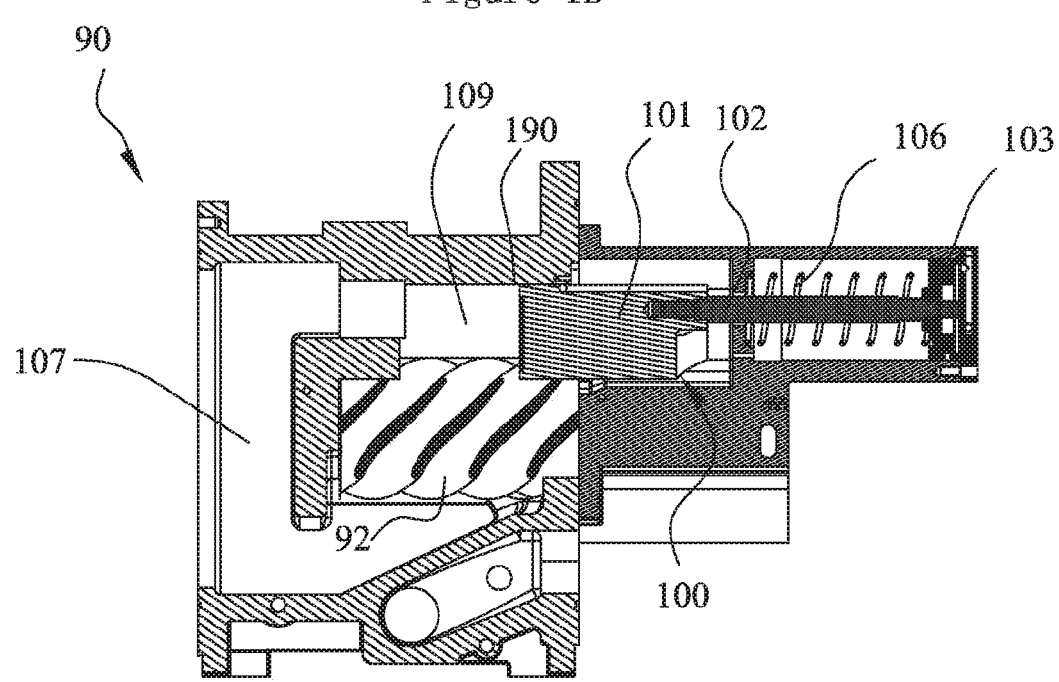
FIG. 1C is a partial cutaway view of a twin-screw compressor in the longitudinal direction of a screw rotor and shows a position (above the screw rotor) of the slide valve at partial load.

However, the slide valve (100) can be provided above the screw rotor (92), as shown in FIG. 1B and FIG. 1C.

FIG. 1B is a partial cutaway view of the twin-screw compressor (90) in the longitudinal direction of the screw rotor (92) and shows a position of the slide valve (100) at full load, and FIG. 1C is a partial cutaway view of the twin-screw compressor (90) in the longitudinal direction of the screw rotor (92) and shows a position of the slide valve (100) at partial load. As shown in FIG. 1B and FIG. 1C, the slide valve (100) of the present disclosure is used in the twin-screw compressor (90) and comprises a slide valve body (101), a slide valve connecting rod (102) connected to a connecting end of the slide valve body (101), a spring (106) placed on the slide valve body (101), and a piston (103) connected to an end of the slide valve connecting rod (102). The slide valve connecting rod (102) can drive the slide valve body (101) to slide in a slide valve slot (190) so that an air return passage (109) can be formed between the slide valve body (101) and a cylinder of the compressor (90). Therefore, the effective working length of screw rotors (92) of the twin-screw compressor (90) can be adjusted to regulate a load of the twin-screw compressor (90) by adjusting a position of the slide valve body (101) in the slide valve slot (190). FIG. 1B shows the position of the slide valve (100) in the twin-screw compressor (90) at full load, where the slide valve body (101) is completely located in the slide valve slot (190), and the slide valve slot (190) is fully filled by the slide valve body (101) so that cooling medium vapors drawn in from a suction side (107) of the twin-screw compressor (90) are completely compressed and discharged. FIG. 1C shows the position of the slide valve (100) in the twin-screw compressor (92) at partial load, where a portion of the slide valve body (101) is located in the slide valve slot (190) so that the slide valve slot (190) forms the air return passage (109) and a part of the cooling medium vapors drawn in from the suction side (107) are not compressed and instead return to the suction side (107) via the air return passage (109). Therefore, the effective working length of the screw rotors (92) is shortened in the configuration shown in FIG. 1C.

Figure 1D:
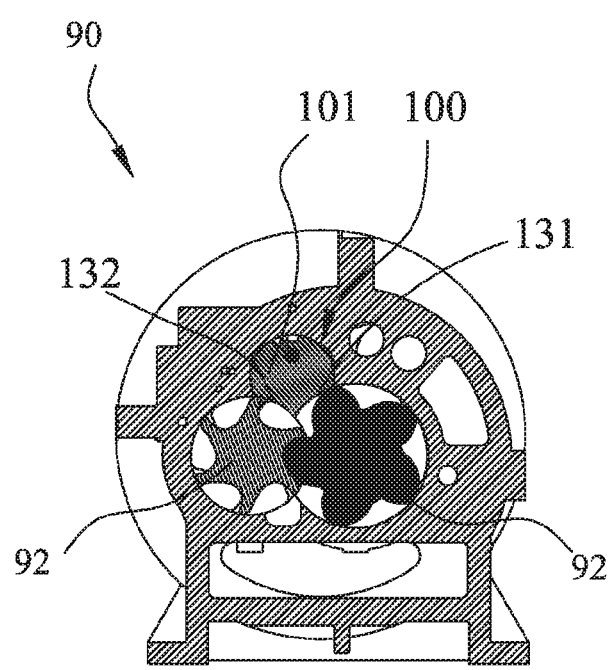
FIG. 1D is a cutaway view of the embodiment shown in FIG. 1B, taken along line D-D of FIG. 1B, and shows a position relationship between the slide valve and the screw rotors of the twin-screw compressor.

To more clearly show the relationship between the slide valve (100) and the screw rotors (92) of the twin-screw compressor (90), FIG. 1D is a cutaway view of the twin-screw compressor (90) shown in FIG. 1B, taken along line D-D of FIG. 1B, where the slide valve body (101) has at least two screw rotor contact surfaces (131 and 132). The two rotor contact surfaces (131 and 132) respectively contact a pair of screw rotors (92), and a sealing interface is formed between the rotor contact surfaces (131 and 132) and the screw rotors (92).

Figure 2A:
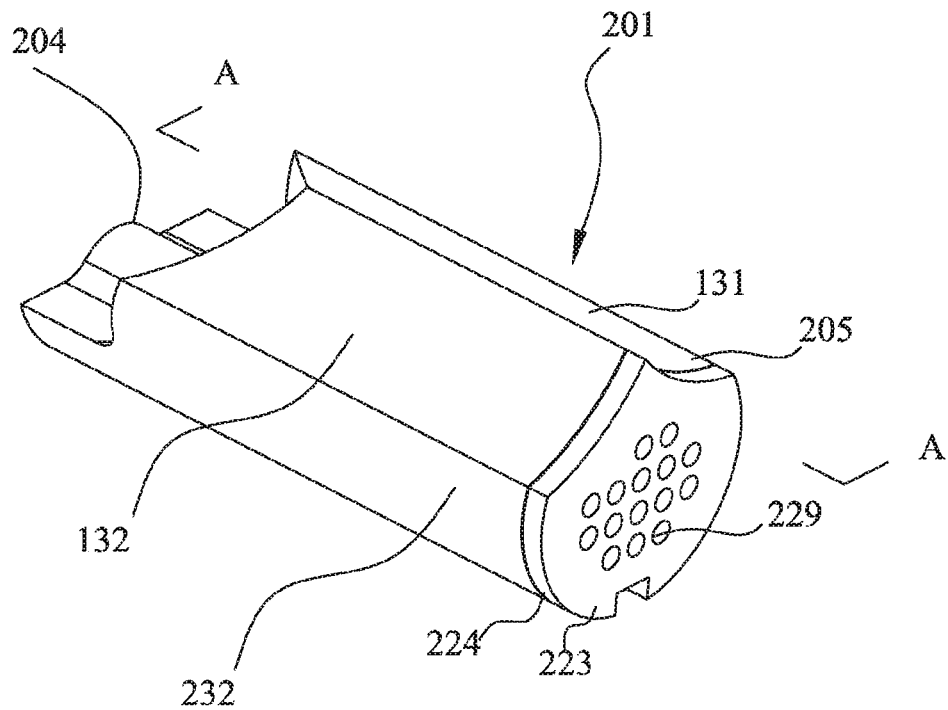
FIG. 2A is a perspective view of a slide valve body in one embodiment of the present disclosure.

FIG. 2A shows the structure of an embodiment of a slide valve body (201), in accordance with the present disclosure. The slide valve body (201) has two screw rotor contact surfaces (131 and 132) and a slide valve slot contact surface (232), where the slide valve slot contact surface (232) is configured to contact the slide valve slot (190). The slide valve body (201) further has a connecting end (204) and a free end (205) which are arranged opposite one another, and the connecting end (204) and the free end (205) are respectively located at the two ends of the slide valve body (201). The connecting end (204) is configured to connect to the slide valve connecting rod (102) so that the slide valve connecting rod (102) can drive the slide valve body (201) to slide within the slide valve slot (190) when the slide valve connecting rod (102) moves. The free end (205) can form the air return passage (109) together with the screw rotors (92)

and a housing of the compressor when the slide valve body (201) slides within the slide valve slot (190).

As shown in FIG. 2A, a cover (223) is connected to an end face (224) of the free end (205), and the cover (223) has a plurality of holes (229). The holes (229) can be in any shape. In the embodiment shown in FIG. 2A, the holes (229) are circular holes or approximately circular holes, and each hole (229) has the same size or a similar size.

Figure 2B:
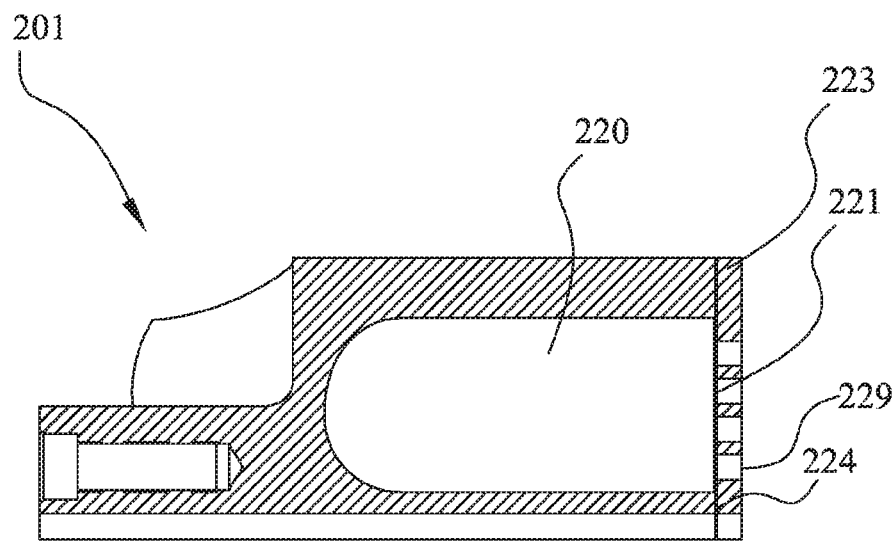
FIG. 2B is a cutaway view of the embodiment of the slide valve body shown in FIG. 2A, taken along line A-A of FIG. 2A.

To show the internal structure of the slide valve body (201), FIG. 2B is a cutaway view of an embodiment of the slide valve body (201) shown in FIG. 2A, taken along line A-A of FIG. 2A. As shown in FIG. 2B, the holes (229) pass through the cover (223) to form a plurality of passages (221). A cavity (220) is formed inside of the slide valve body (201). Specifically, the cavity (220) extends into the slide valve body (201) from the end face (224) of the free end (205). One end of each passage (221) is connected to the cavity (220), and the other end of each passage (221) is connected to an external fluid via the holes (229). Thus, the cavity (220) is configured to be fluidly connected to the external fluid via the passages (221).

When air flow of the twin-screw compressor (90) pulsates, the cavity (220) accommodates the pulsating air flow by absorbing energy of the air flow pulsations and buffering the air flow. Thus, air flow pulsations are reduced, and vibrations and noise of the twin-screw compressor (90) are alleviated.

As an exemplified embodiment, the cavity (220) can be an integral cavity (220), as shown in FIG. 2B. In other exemplified embodiments, the cavity (220) can also be or include a plurality of cavities (320), as shown in FIG. 3B and FIG. 3C.

Figure 3A:
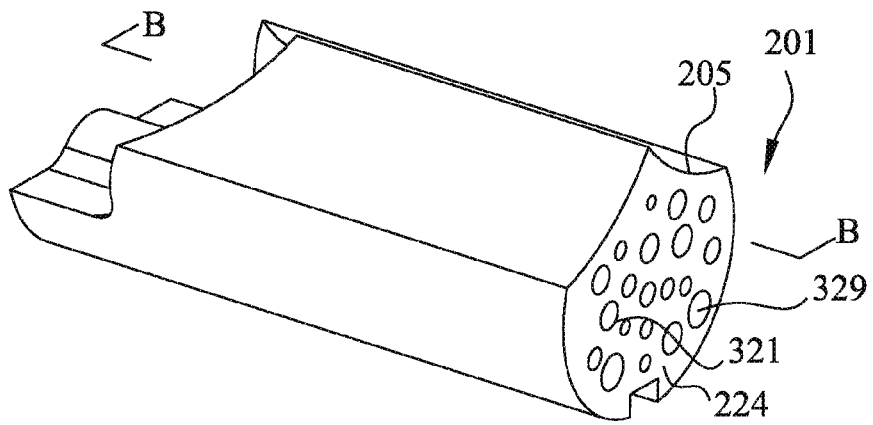
FIG. 3A is a perspective view of a slide valve body of another embodiment of the present disclosure.

As another implementation of the present disclosure, no cover (223) may be provided on the end face (224) of the free end (205) of the slide valve body (201). As shown in FIG. 3A, the holes (329) can be directly formed in and on the end face (224) of the free end (205) so that one end of each of the passages (321) is connected to a respective one of the cavities (320), and the other end of each of the passages (321) is connected to external air flow via the direct passing of holes (329) through the end face (224) of the free end (205). Thus, the cavities (320) in the slide valve body (201) can be connected to the external air flow via the passages (321). As an exemplified embodiment, holes (329) can have different sizes and/or shapes so that the passages (321) can also have different inside diameters.

Figure 3B:
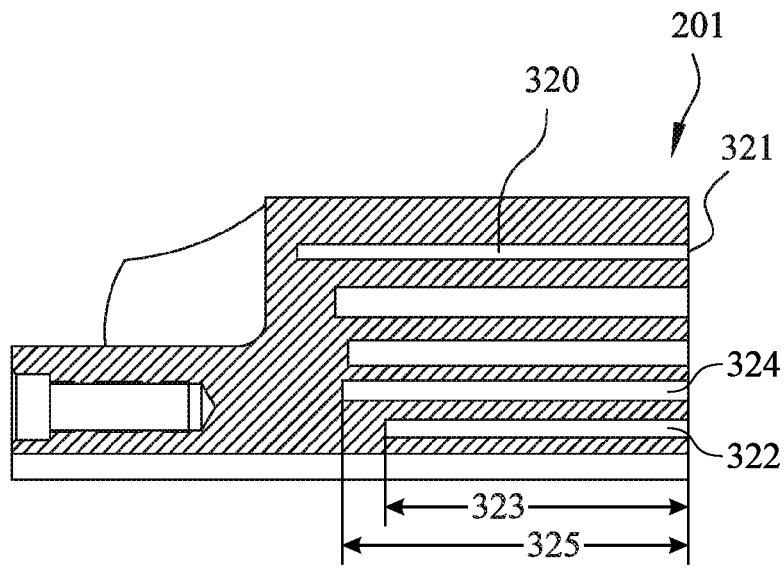
FIG. 3B is a cutaway view of the embodiment of the slide valve body shown in FIG. 3A, taken along line B-B of FIG. 3A.
Figure 3C:
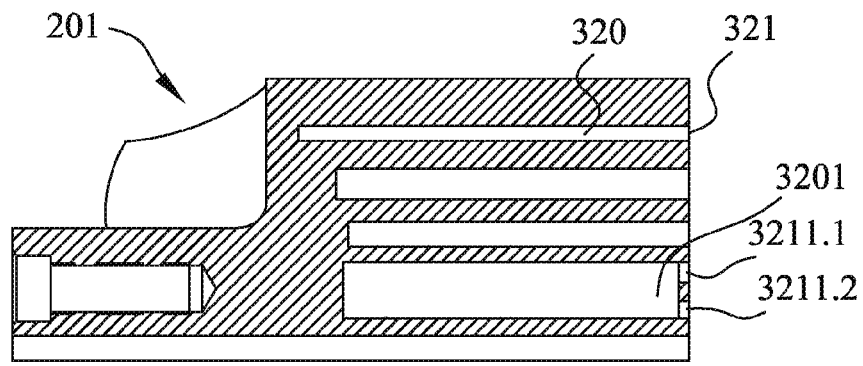
FIG. 3C is a cutaway view of the embodiment of the slide valve body shown in FIG. 3A, taken along line B-B of FIG. 3A.

FIG. 3B and FIG. 3C are cutaway views of the slide valve body (201) shown in FIG. 3A, taken along line B-B of FIG. 3A, and show two exemplified embodiments in which a plurality of cavities (320) is provided in the slide valve body (201). By providing the plurality of cavities (320) in the slide valve body (201), the weight of the slide valve body (201) can be reduced and the reliability of the structure of the slide valve body (201) can be improved. In the exemplified embodiment shown in FIG. 3B, each cavity (320) of said plurality of cavities (320) has its own passage (321) so that each cavity (320) of the plurality of cavities (320) is connected to external air flow via its own passage (321). In the illustrated embodiment of FIG. 3B, a first cavity (322) of the plurality of cavities (320) extends a first distance (323) from the end face (224) of the free end (205) into the slide valve body (201), and a second cavity (324) of the plurality of cavities (320) extends a second distance (325) from the end face (224) of the free end (205) into the slide valve body (201), where the first distance (323) and the second distance (325) are different from one another. In the exemplified embodiment shown in FIG. 3C, a portion or subset of the plurality of cavities (320) has their own passage (321). Other cavities, such as cavity (3201), are connected to the external fluid via a plurality of passages (3211.1 and 3211.2). As an exemplified embodiment, when one of the cavities (320) is connected to the external fluid via the plurality of passages (3211.1 and 3211.2), the cavity (320) may be larger than the cavities (320) having their own, single passage (321). Therefore, the ability of the cavities (320) to absorb air flow pulsations is improved, and the reliability of the structure of the slide valve body (201) is improved.

Figure 4A:
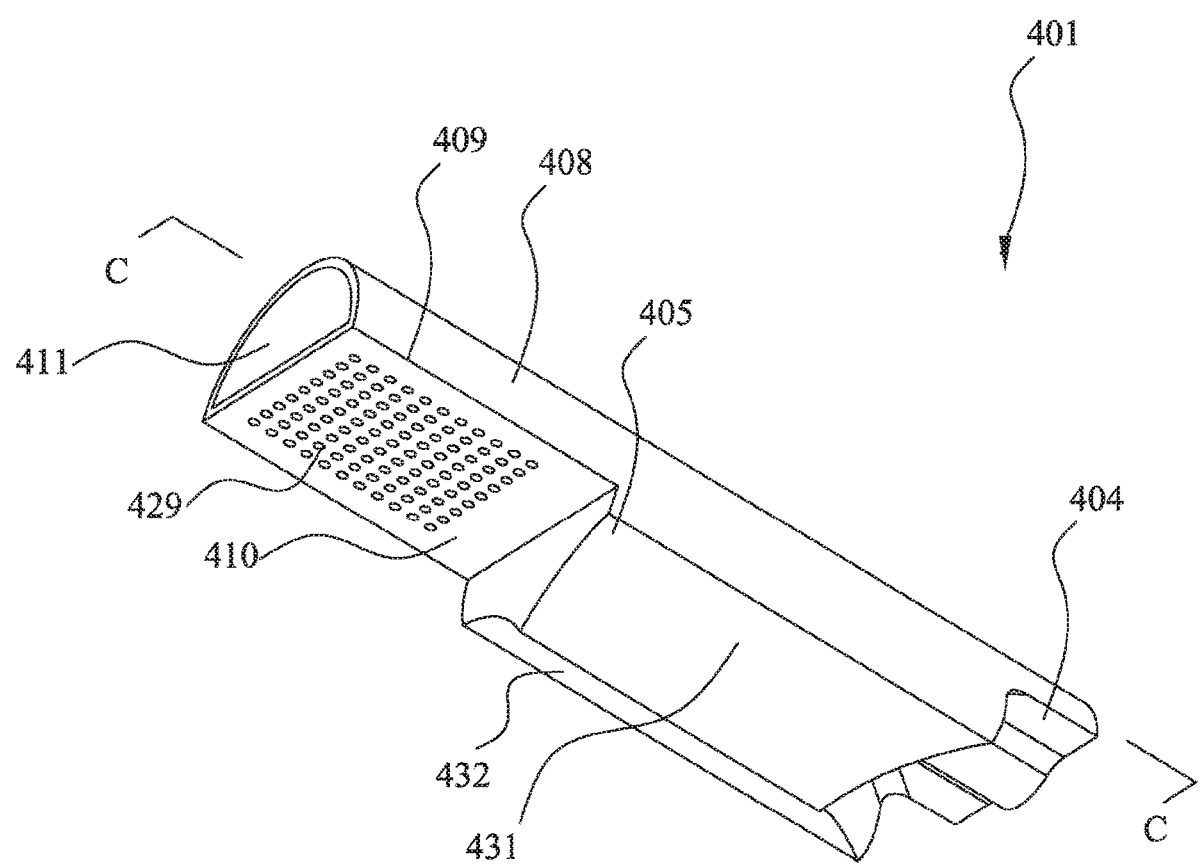
FIG. 4A is a perspective view of a slide valve body of a third embodiment of the present disclosure.

The slide valve body (201) can have different shapes, depending on the type of the twin-screw compressor (90) having the slide valve body (201). As an exemplified embodiment, FIG. 4A shows the shape of a slide valve body (401). The slide valve body (401) has a connecting end (404) and a free end (405). The free end (405) has a free end extension portion (408) extending away from the free end (405). A top (409) of the free end extension portion (408) is lower than screw rotor contact surfaces (431 and 432) of the free end (405) so that a stepped connecting surface, such as stepped surface (410), is formed. If space in the twin-screw compressor (90) permits, the free end extension portion (408) can extend between a wall of the twin-screw compressor (90) cylinder and a housing of the screw rotors (92) when the slide valve (100) moves therein. Thus, the stability of the slide valve during sliding is improved, and the reliability of the slide valve (100) is further improved.

Figure 4B:
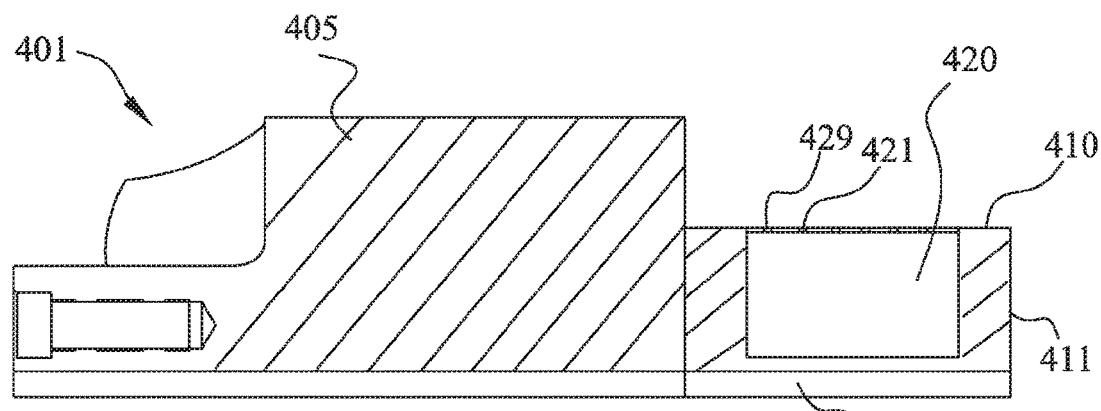
FIG. 4B is a cutaway view of the embodiment of the slide valve body shown in FIG. 4A, taken along line C-C of FIG. 4A.

The free end extension portion (408) has holes (429) on a surface of the free end extension portion (408). Specifically, as shown in FIG. 4A, the holes (429) can be located on the stepped surface (410) of the free end extension portion (408) or can be located on an outside surface (411) of the free end extension portion (408). FIG. 4B shows a cutaway view of an embodiment of the slide valve body (401) shown in FIG. 4A, taken along line C-C of FIG. 4A. As shown in FIG. 4B, the free end extension portion (408) has an integral cavity (420) formed inside the free end extension portion (408), and the cavity (420) has a plurality of passages (421). The passages (421) are connected to an external fluid via holes (429), thereby fluidly connecting the cavity (420) with the external fluid. The outside surface (411) can have holes (429) or can be a closed end face.

Similar to FIG. 3B and FIG. 3C, the free end extension portion (408) can have a plurality of cavities (420) formed therein, and the plurality of cavities (420) can be connected to the external fluid via one or more passages (421). Thus, air flow pulsations produced during operation of the twin-screw compressor (90) can be buffered via the cavities (420), and an air flow pulsation attenuating structure is formed.

The slide valve body (101) of the present disclosure can be integrally formed as a one piece structure, via the use of molds, or the slide valve body can be formed by machining a conventional slide valve body. The machining method is simple and easy to realize.

Although some characteristics of the present disclosure are shown and described in the present discussion, those skilled in the art can make various improvements and modifications. Therefore, it should be understood that the attached claims are intended to cover the above-mentioned improvements and modifications within the spirit and scope of the present disclosure.

The invention claimed is:

1. A slide valve configured to regulate a load of a twin-screw compressor, comprising:
   a slide valve body of the slide valve, wherein the slide valve body has a connecting end and a free end, the connecting end is configured to connect to a slide valve connecting rod of the twin-screw compressor, the slide valve is configured to be driven by the slide valve connecting rod, the free end of the slide valve body comprises an end face configured to at least partially define an air return passage of the twin-screw compressor, a cavity is formed in the end face of the free end and extends into the slide valve body, the slide valve has at least one passage configured to fluidly couple the cavity to an external fluid to reduce air flow pulsations on a suction side of the twin-screw compressor, the at least one passage is configured to fluidly couple the cavity to the air return passage to enable flow of the external fluid from the air return passage into the cavity, the cavity is one of a plurality of cavities formed in the free end, and each cavity of the plurality of cavities has its own single passage.

2. The slide valve of claim 1, wherein the cavity and the at least one passage are formed directly in the end face of the free end of the slide valve body.

3. The slide valve of claim 1, wherein at least two respective passages corresponding to at least two cavities of the plurality of cavities comprise different sizes, different shapes, or both, relative to one another.

4. The slide valve of claim 1, wherein a first cavity of the plurality of cavities extends a first distance from the end face of the free end into the slide valve body, a second cavity of the plurality of cavities extends a second distance from the end face of the free end into the slide valve body, and the first distance and second distance are different from one another.

5. The slide valve of claim 1, wherein each single passage comprises a circular geometry.

6. The slide valve of claim 1, wherein the slide valve body is an integrally formed, one-piece structure.

7. The slide valve of claim 1, wherein the slide valve body comprises a first rotor contact surface and a second rotor contact surface, wherein the first rotor contact surface is configured to contact a first screw rotor of the twin-screw compressor, and the second rotor contact surface is configured to contact a second screw rotor of the twin-screw compressor.

8. A slide valve configured to regulate a load of a twin-screw compressor, comprising:
a slide valve body of the slide valve, wherein the slide valve body has a connecting end and a free end, the connecting end is configured to connect to a slide valve connecting rod of the twin-screw compressor, the slide valve is configured to be driven by the slide valve connecting rod, a cavity is formed in the free end and extends into the slide valve body, the slide valve has at least one passage configured to fluidly couple the cavity to an external fluid to reduce air flow pulsations on a suction side of the twin-screw compressor, wherein the cavity and the at least one passage are formed directly in an end face of the free end of the slide valve body, wherein the cavity is one of a plurality of cavities formed in the free end, the plurality of cavities comprises a first set of cavities, each cavity of the first set of cavities having a single passage, and wherein the plurality of cavities comprises a second cavity, and wherein the second cavity is not in the first set of cavities, and the second cavity has a plurality of passages.

9. The slide valve of claim 8, wherein at least two single passages corresponding to at least two cavities of the first set of cavities comprise different sizes, different shapes, or both, relative to one another.

10. The slide valve of claim 8, wherein the second cavity is larger than each cavity of the first set of cavities.

11. The slide valve of claim 8, wherein the slide valve body is an integrally formed, one-piece structure.

12. A slide valve configured to regulate a load of a twin-screw compressor, comprising:
a slide valve body of the slide valve, wherein the slide valve body has a connecting end and a free end, the connecting end is configured to connect to a slide valve connecting rod of the twin-screw compressor, the slide valve is configured to be driven by the slide valve connecting rod, a cavity is formed in the free end and extends into the slide valve body, the slide valve has at least one passage configured to fluidly couple the cavity to an external fluid to reduce air flow pulsations on a suction side of the twin-screw compressor, the free end of the slide valve body comprises an end face configured to at least partially define an air return passage of the twin-screw compressor, the cavity is formed in the end face, and the at least one passage is configured to fluidly couple the cavity to the air return passage to enable flow of the external fluid from the air return passage into the cavity.

13. The slide valve of claim 12, wherein the slide valve body comprises a plurality of cavities formed in the free end, the plurality of cavities comprises the cavity, the slide valve body comprises a plurality of passages, and the plurality of passages comprises the at least one passage.

14. The slide valve of claim 13, wherein at least two passages of the plurality of passages comprise different sizes, different shapes, or both, relative to one another.

15. The slide valve of claim 12, wherein the slide valve body is an integrally formed, one-piece structure.

16. The slide valve of claim 12, wherein the slide valve body comprises a first rotor contact surface and a second rotor contact surface, wherein the first rotor contact surface is configured to contact a first screw rotor of the twin-screw compressor, and the second rotor contact surface is configured to contact a second screw rotor of the twin-screw compressor.

* * * * *